United States Patent
Haas et al.

(10) Patent No.: US 9,290,324 B2
(45) Date of Patent: Mar. 22, 2016

(54) TRANSFER APPARATUS WITH ADJUSTABLE BENDING LINE OF THE TRANSFER BODY

(71) Applicant: HAAS FOOD EQUIPMENT GMBH, Vienna (AT)

(72) Inventors: Johannes Haas, Vienna (AT); Josef Haas, Leobendorf (AT); Stefan Jiraschek, Koenigsbrunn (AT); Peter Lambauer, Hitzendorf (AT)

(73) Assignee: Haas Food Equipment GmbH, Vienna (AT)

( * ) Notice: Subject to any disclaimer, the term of this patent is extended or adjusted under 35 U.S.C. 154(b) by 0 days.

(21) Appl. No.: 14/405,411

(22) PCT Filed: May 8, 2013

(86) PCT No.: PCT/EP2013/059612
§ 371 (c)(1),
(2) Date: Dec. 4, 2014

(87) PCT Pub. No.: WO2013/182371
PCT Pub. Date: Dec. 12, 2013

(65) Prior Publication Data
US 2015/0107968 A1 Apr. 23, 2015

(30) Foreign Application Priority Data
Jun. 8, 2012 (AT) ..................... 659/2012

(51) Int. Cl.
*B65G 23/44* (2006.01)
*B65G 15/62* (2006.01)
*A21C 9/08* (2006.01)
*B65G 15/28* (2006.01)

(52) U.S. Cl.
CPC . *B65G 15/62* (2013.01); *A21C 9/08* (2013.01); *B65G 15/28* (2013.01); *B65G 23/44* (2013.01); *B65G 2201/0202* (2013.01)

(58) Field of Classification Search
CPC ......... B65G 23/02; B65G 23/44; B65G 47/66
USPC .................................. 198/813, 600
See application file for complete search history.

(56) References Cited

U.S. PATENT DOCUMENTS

| | | | | | |
|---|---|---|---|---|---|
| 1,656,114 | A | * | 1/1928 | Hollingsworth | 198/592 |
| 2,438,068 | A | * | 3/1948 | Mercier | 198/813 |
| 3,456,776 | A | * | 7/1969 | Viene | 198/813 |
| 4,206,994 | A | * | 6/1980 | Silverberg et al. | 198/841 |

(Continued)

FOREIGN PATENT DOCUMENTS

| AT | 41399 B | 4/1989 |
|---|---|---|
| GB | 573586 A | 11/1945 |

*Primary Examiner* — James R Bidwell
(74) *Attorney, Agent, or Firm* — Laurence A. Greenberg; Werner H. Stemer; Ralph E. Locher (57) ABSTRACT

An apparatus for transporting and for transferring shaped bodies such as, for example, substantially non-rigid shaped bodies, for example of cookie dough, onto a transport surface. The apparatus for transporting the shaped bodies includes a revolving driven conveyor belt which is guided around at least one deflecting roller, a guide roller and in the region of the transport surface around a transfer body mounted laterally on a machine frame. An adjusting device is provided for variation and adaptation of the bending line of the transfer body.

9 Claims, 5 Drawing Sheets

(56) References Cited

U.S. PATENT DOCUMENTS

| | | | |
|---|---|---|---|
| 4,684,008 A * | 8/1987 | Hayashi et al. | 198/436 |
| 5,026,326 A * | 6/1991 | Pollich et al. | 198/813 |
| 5,564,554 A | 10/1996 | Lawrence | |
| 5,605,222 A * | 2/1997 | Huberty et al. | 198/841 |
| 7,681,719 B2 * | 3/2010 | Hosch et al. | 198/861.1 |
| 7,698,977 B2 * | 4/2010 | Culling | 83/88 |
| 2003/0228396 A1 | 12/2003 | Okaizumi et al. | |

* cited by examiner

TRANSFER APPARATUS WITH ADJUSTABLE BENDING LINE OF THE TRANSFER BODY

BACKGROUND OF THE INVENTION

Field of Invention

The invention relates to an apparatus for transporting and for transferring shaped bodies such as, for example substantially non-rigid, biscuit dough, shaped bodies, onto a transport surface, where the apparatus for transporting the shaped bodies comprises a revolving driven conveyor belt which is guided over at least one deflecting roller, one drive roller and in the region of the transport surface around a transfer body mounted laterally on a machine frame.

The field of the invention relates to apparatuses for transferring shaped bodies such as unbaked flat dough cakes, unbaked biscuit shaped bodies, unbaked dough pieces but also baked biscuit shaped bodies, brittle baked products etc. In particular, the invention relates to an apparatus for transferring brittle and slightly deformable shaped bodies from a conveyor belt onto another transport surface, where the transfer takes place via a transfer edge. The quality of the transfer is all the better, the smaller the transfer gap between the conveyor belt and the further transport surface. The invention further relates to apparatuses which are suitable for the industrial production of baked products such as, for example, biscuits.

Such apparatuses have been known for a long time. In this case, conveyor belts having a width of up to 3 m are guided over a plurality of deflecting rollers, at least one drive roller and around a transfer body. Furthermore, a tensioning roller is disposed in the course of the conveyor belt, which imparts a certain basic tension to the conveyor belt. The transfer body is preferably designed as a transfer blade. This means that the belt is guided around a transfer edge in the region of the transfer body. This transfer edge is designed to be as sharp as possible to reduce or optimise the transfer gap. To this end, so-called transfer blades are used. These are connected substantially rigidly to a machine frame. The machine frame usually comprises two side plates running laterally parallel to the transport direction of the belt on which the transfer body is mounted. As a result of the tension of the belt and the large span of the transfer body between the lateral bearing points, sagging of the transfer body occurs along a bending line. As a result of the sagging, the transfer gap varies, which subsequently leads to a poor-quality transfer. In order to minimise the sagging, according to the prior art the transfer blades have larger dimensions. In the transport direction of the shaped body, this is easily possible by selecting a larger transfer surface, that is a larger dimensioning in the transport direction. However, the thickness of the transfer blade normal to the transport direction is limited by the sharp deflection of the belt. A further disadvantage of massively dimensioned transfer bodies is that high material costs are incurred during production.

A further disadvantage of the transfer apparatuses according to the prior art is that the transfer blade is substantially rigidly connected to the machine frame. In certain operating situations however, it is necessary to remove the conveyor belt from the transport surface.

BRIEF SUMMARY OF THE INVENTION

It is now the object of the invention to provide an apparatus for transporting and for transferring shaped bodies which allows a high-quality transfer and furthermore is favourable to manufacture, low-maintenance in operation and practical to use.

The objects according to the invention are solved by providing an adjusting apparatus to vary and adapt the bending line of the transfer body.

Further features according to the invention are that the adjusting apparatus comprises a pressure element such as, for example, a threaded screw, a bolt or a lug and that the pressure element is supported on a support point of the transfer body, that at least one, preferably two tensile elements are provided, that the tensile elements are each coupled to the transfer body at a connection point and/or that the connection point is positioned remotely from the support point on the transfer body.

The invention is further characterised in that the support point is provided in a central region and the connection points are provided on both sides of the central region respectively in an outer region of the transfer body, that the transfer body has a transfer surface and that the support point of the adjusting apparatus is provided on the opposite side of the transfer body, that the transfer body has a transfer edge and for example is configured as a transfer blade or transfer plate, that the support point is provided in the region of the greatest sagging of the transfer body and/or that the connection points of the tension elements are each provided in the region of the machine frame on the transfer body.

Preferably the apparatus according to the invention comprises a conveyor belt which is guided around a plurality of deflecting rollers. The conveyor belt is driven in a revolving manner by a drive roller and is deflected around a transfer body in the region of the transport surface onto which the shaped body is to be transferred. The transfer is accomplished via a transfer gap. The transfer body is preferably designed as a transfer blade. Designated as transfer blade in this context is a body which has a transfer contour and allows a transfer of the shaped body mentioned initially. A flat or linear section of the transport body or of the conveyor belt in the region of the transfer body is designated as transfer contour in this case, at which the shaped bodies leave the conveyor belt. In the case of a sharp transfer edge the transfer contour is defined substantially linearly transversely to the transport direction. In the case of soft non-rigid shaped bodies which are transferred via a rounding, the transfer contour is defined as a section of a substantially cylindrical lateral surface which also runs transversely to the transport direction of the shaped bodies. The transfer gap is provided substantially between the transport surface and the transfer contour or is delimited by these elements.

As a result of the belt tension, a force is exerted by the belt into the transfer body. The force substantially corresponds to the sum of those forces produced by the incoming and outgoing belt in the region of the transfer body. The resultant of the two force vectors in this case need not necessarily lie in the angle bisector of the two force vectors of the belt since as a result of the friction relationships at the transfer body, the tensile force at the outgoing belt is usually greater than the tensile force in the incoming belt. If the transfer body has a plane of symmetry which differs from the direction of the resulting force of the conveyor belt, in addition to pure sagging of the transfer body, a curvature or a spatial deformation also occurs. As a result of a deformation of the transfer body, at least the width of the transfer gap varies in some regions. In order to be able to select or vary the deformation of the bending line, the adjusting apparatus according to the invention is provided.

For influencing the bending line of the transfer body, according to the present invention at least one tensile element and at least one pressure element are provided. Preferably both the pressure element and the tensile element are supported on the transfer body. According to an alternative embodiment, however the tensile element or the pressure element can be supported on the machine frame. In a preferred embodiment the tensile element or the tensile elements is or are coupled to the transfer body at respectively one position. The coupling of the tensile elements to the transfer body is preferably arranged in the region of or in the vicinity of the connection to the machine frame. The pressure element is preferably coupled to the transfer body at the support point in the region of the greatest sagging of the transfer body. In a usual arrangement the support point or the region of the greatest sagging of the transfer body is located in the central region between the two bearing points of the transfer body on the machine frame.

As a result of the arrangement of the pressure element and the tensile elements, a truss-like configuration is achieved. By varying the length of one of the elements or by varying the position of the elements with respect to one another, the forces in the truss—i.e. in the transfer body, the pressure element and/or the tensile element—can be varied. The variation of the forces influences the bending lines of the transfer body. Preferably the pressure element is coupled to the transfer body at a first region, in particular at the support point. The pressure element or the force exerted by the pressure element on the transfer body in this case runs substantially normally to the longitudinal extension of the transfer body or normally to the bending line of the transfer body at the application point of the pressure element.

At a second region which located at a distance from the coupling point between transfer body and pressure element on the pressure element, the tensile element is coupled to the pressure element. Furthermore, the pressure element is coupled at least at one point, preferably at two points on an outer region of the transfer body to the transfer body. In the case of several tensile elements it can also be provided that the tensile element is coupled at one point to the pressure element and at a second point to the transfer body. By varying the coupling point of the tensile element or elements to the pressure element whilst keeping the length of the tensile elements constant, the tensile force in the tensile element and the compressive force in the pressure element can be increased. Furthermore, the force equilibrium can also be adapted by means of a length variation of the pressure element or by a length variation of the tensile element. As a result of the arrangement of the forces, substantially those forces which act on the transfer body due to the conveyor belt are counteracted. In particular, the compressive force of the pressure element is oppositely directed to the resulting force of the belt tensions where both vectors need not run coaxially. On the contrary the bending line can be varied due to an inclination of the oppositely directed vectors with respect to one another.

For example, plastic belts, flexible plastic belts, flexible metal belts, discontinuous metal belts such as, for example, spiral link belts, link belts, chain belts etc. are suitable as conveyor belts. Fundamentally all conveyor belts which are suitable for transferring shaped bodies, in particular food shaped bodies around a blade edge or around a transfer blade, are suitable for use in the apparatus according to the invention.

The apparatus is preferably used "in-line" in a machine for the industrial manufacture of baked products. This means that the machine frame of the apparatus according to the invention is disposed substantially in a fixed position with respect to other components of the machine for industrial production of baked products. Furthermore, a control unit is provided for controlling the drive. This control unit can be coupled to the control unit of other components of the machine to produce baked products and/or a control unit is provided which controls both the apparatus according to the invention and also further components of the machine for the industrial production of baked products.

The transfer body is preferably designed as a transfer blade. This has a transfer surface along which the shaped body and the conveyor belt are guided. The transfer surface of the transfer blade can in this case run horizontally or be inclined. The transfer blade itself can be foldable or be screwed fixedly to the frame. Furthermore, the transfer blade can also be arranged displaceably and fixedly in a slot of the machine frame. The transfer blade is, for example, strip-shaped; elongate, having an approximately rectangular cross-section. The deflection of the conveyor belt on the transfer body is preferably designed in such a manner that the conveyor belt is deflected about an approximately horizontally running contour in the direction of gravity. The angle of deflection is in this case at least 90°, preferably 90° to 180°. The deflection angle is preferably measured in a perpendicular plane running in the transport direction.

BRIEF DESCRIPTION OF SEVERAL VIEWS OF THE INVENTION

The apparatus according to the invention is discussed further subsequently with reference to specific exemplary embodiments.

DESCRIPTION OF THE INVENTION

Figure 1:
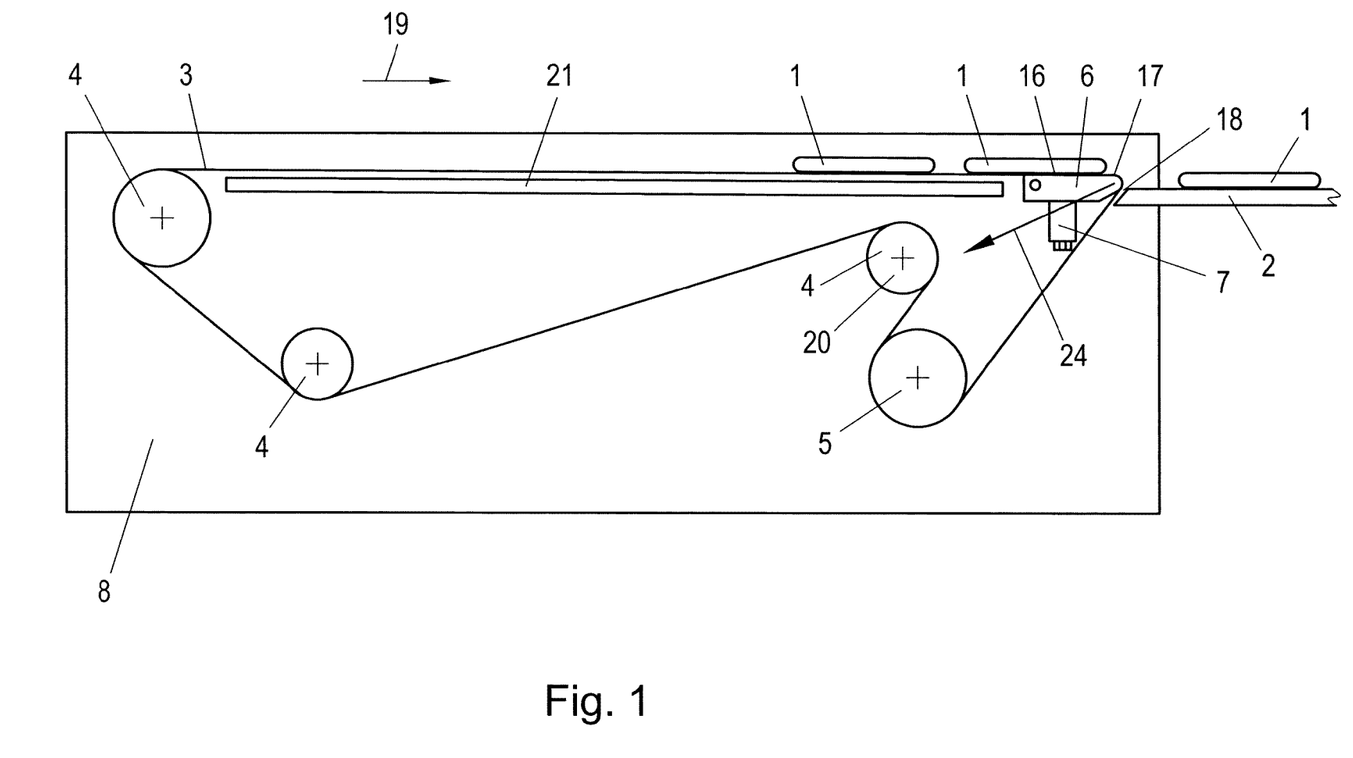
FIG. 1 shows a schematic side view of an apparatus according to the invention.

FIG. 1 shows an apparatus for transferring shaped bodies 1 from a conveyor belt 3 onto a transport surface 2. The shaped bodies 1 are in this case conveyed in the transport direction 19 by a revolvingly driven conveyor belt 3. The transport surface 2 onto which the shaped bodies 1 are transferred is shown schematically as a plate-shaped body. According to the invention and according to the listed figures, the transport surface 2 is designed, for example, as a further conveyor belt, as the baking belt of a baking machine, as an oven transfer apparatus, as a sliding surface or as a conveyor belt of a packaging machine.

The conveyor belt 3 is guided around a plurality of deflecting rollers 4, around a drive roller 5 and around a transfer body 6. One of the deflecting rollers 4 is preferably designed as a tensioning roller 20. This tensioning roller 20 is pressed against the conveyor belt 3 in a spring-mounted manner and imparts to the conveyor belt 3 a selectable basic tension. Furthermore, guiding means 21 are provided for supporting the conveyor belt 3 in that region in which the shaped bodies 1 are conveyed. These guiding means are used to support the conveyor belt 3 against gravity. The guide means can, for example, be plate-shaped or strip-shaped and are configured substantially following the conveyor belt 3 or following the transport direction 19. The deflecting rollers 4, the drive roller 5, the tensioning roller 20, the transfer body 6 and optionally also the guide means 21 are mounted on a machine frame 8. In the present embodiment, the machine frame 8 comprises two side plates which are provided laterally on the apparatus substantially following the transport direction 19. Rotational elements such as, for example, deflecting rollers 4, drive rollers 5 and tensioning rollers 20 are preferably mounted in rotational bearings on the machine frame. The guide means 21 are preferably connected rigidly or substantially rigidly to the machine frame 8. The transfer body 6 can be connected rigidly or movably to the machine frame 8. Preferably the transfer body can be moved to a certain extent, in particular within the range of kinematic possibilities, with respect to the machine frame 8.

The transfer of the shaped body 1 is accomplished as noted via a transfer gap 18. On the transfer contour 17 of the conveyor belt 3 the shaped body 1 at least partially leaves the conveyor belt 3 in the direction of the transport surface 2.

As a result of the belt tension, the resulting force vector 24 acts on the transfer body 6. The resulting force vector 24 corresponds to the cumulative sum of the forces applied to the transfer body 6 by the conveyor belt 3. Oppositely directed to the resulting force are reaction forces which act in the outer regions of the transfer body 6, in particular in the region of the machine frame 8, on the transfer body 6 and on the machine frame.

As a result of this configuration, the transfer body 6 under loading of the conveyor belt 3 corresponds to a laterally mounted bending member when viewed in simplified manner. This has a bending line which in particular is determined by the shape of the transfer body 6. Furthermore, the apparatus according to the invention has an adjusting apparatus 7 for influencing and/or varying the bending line.

Figure 2:
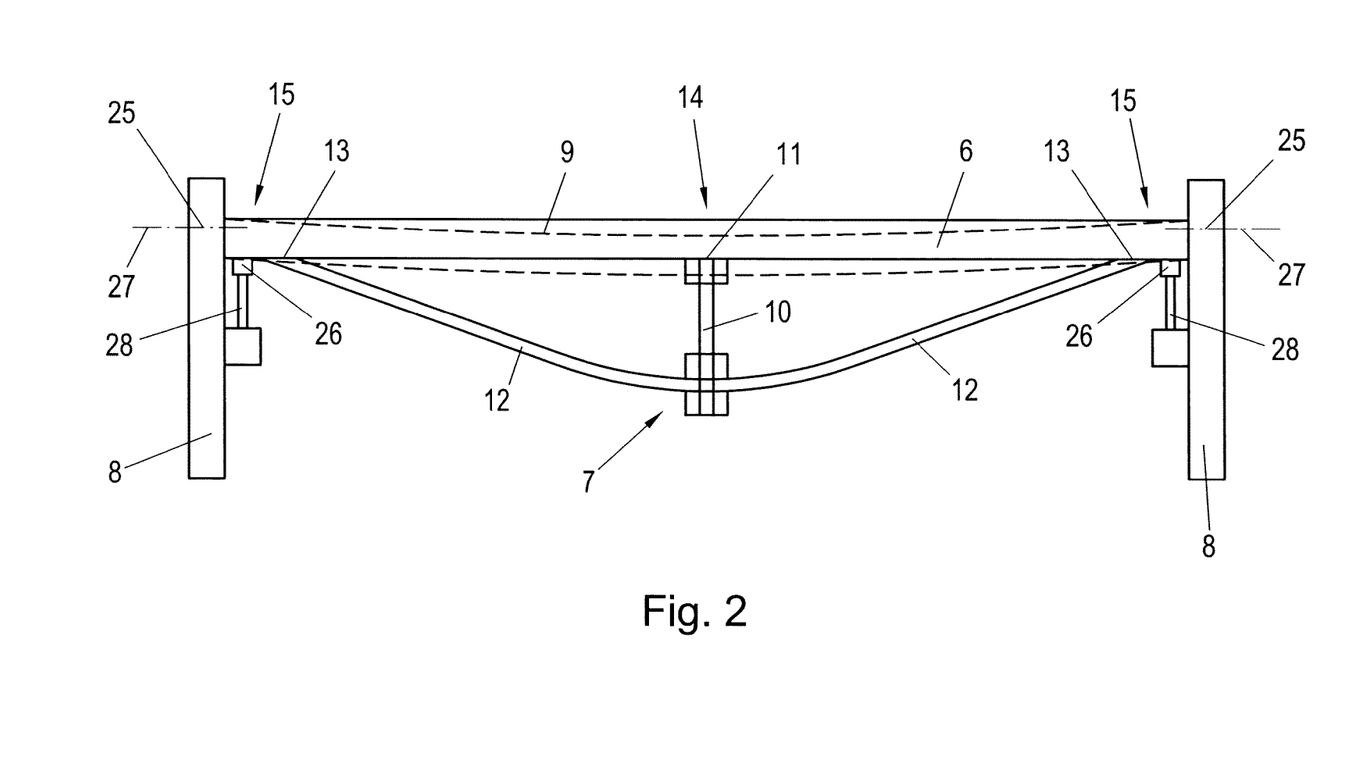
FIG. 2 shows a schematic view of crucial parts of the apparatus, where the viewing direction is substantially opposite to the transport direction.

FIG. 2 shows a further schematic view of an apparatus according to the invention, in particular a view of crucial parts where the viewing direction is substantially opposite to the transport direction 19 in FIG. 1. Elements such as for example drive rollers, the conveyor belt and the transport surface are not shown in the diagram in FIG. 2. In the present diagram the transport direction 19 runs in a projecting manner.

The transfer body 6 is provided between two side plates of the machine frame 8. The transfer body is on the one hand connected via connecting elements 25 and on the other hand via stops 26 to the machine frame. In the present embodiment the connecting elements 25 are designed, for example, as a bolt connection, where the transfer body 6 is rotatable about the axes of rotation 27 of the connecting elements 25. For the fixing and/or choice of position preferably respectively one stop 26 is provided in the outer regions 15 of the transfer body 6. This stop is connected to the machine frame 8. In the present embodiment the stop has a height adjustment 28. This is executed, for example, by means of a threaded screw screwed into a thread. The distance between the element connected to the machine frame 8 and the element of the height adjustment 28 in operative contact with the transfer body 6 is varied by screwing the threaded screw more deeply or less deeply. By this means the inclination of the transfer body 6 about the axis of rotation 27 can be varied and/or selected.

According to the preceding description, the transfer body has a certain bending line 9. In order to guide the bending line, for example, rectilinearly, an adjusting apparatus 7 is provided. The adjusting apparatus 7 in the present embodiment comprises one or two tensile elements 12 which are connected to the transfer body 6 at respectively one connection point 13. Furthermore, the adjusting apparatus 7 comprises a pressure element 10 which on the one hand is coupled to the tensile elements 12 and on the other hand to the transfer body 6 at a support point 11. The variation of the bending line is accomplished in this case by means of an introduction of force of one element of the adjusting apparatus 7 onto the transfer body 6 in the central region 14. The counterforces to this force can, according to the present embodiment, be supported on the transfer body 6 itself. To this end, the tensile elements 12 are connected to the transfer body 6 and the pressure element 10. A force equilibrium is thus achieved which results from the tensile forces in the tensile elements 12 and the compressive forces in the support point 11 and/or in the compressive element 10. By varying the position of the tensile elements or by varying the length of the compressive element, the forces can be varied so that the bending line 9 of the transfer body 6 is also adapted.

In the present embodiment the tensile element 12 in the outer regions 15 of the transfer body 6 is firmly connected to this. In the central region 14 the tensile element 12 is connected to the compressive element 10 and in particular clamped between two threaded nuts. By twisting the nuts on a threaded shank, the position of the nuts can be varied. A fixing of the position can be achieved through the counteracting of two nuts between which the tensile element 12 is clamped. Furthermore, the compressive element 10 comprises a screw shank which is screwed into a threaded hole of the transfer body 6. By providing a nut this connection can also be clamped and therefore fixed.

The support point of the adjusting apparatus is preferably provided centrally, in particular in the central region 14.

Figure 3:
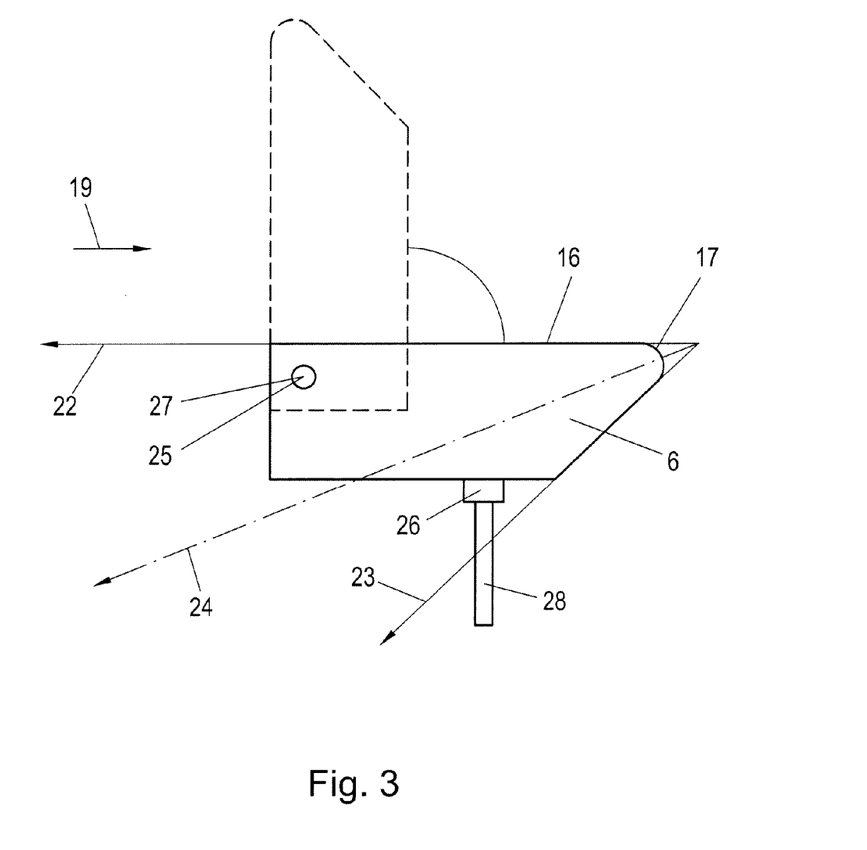
FIG. 3 shows a schematic view of the kinematic relationships at the transfer body.

FIG. 3 shows a detail of a side view of the kinematic relationships, in particular in the region of the transfer body 6. In a first position—that position with a continuous border of the transfer body 6—the transfer body 6 is located in the usual position ready for use. To this end the conveyor belt is guided around the transfer body 6. As a result of the tension of the conveyor belt, on the one hand a force vector 22 of the incoming conveyor belt and on the other hand, a force vector 23 of the outgoing conveyor belt are defined. In the present view the lengths of the vectors are not proportional to the forces occurring in reality. In particular, due to the friction of the deflection of the belt of the transfer contour in the usual belt configuration the force vector of the outgoing belt 23 is greater than the force vector 22 of the incoming belt. As a result of vector addition of the two vectors, we arrive at the resulting force vector 24.

In the present embodiment, the transfer body 6 on the machine frame is connected via a connecting element 25 and via a stop 26 to the machine frame 9. Furthermore, according to the present embodiment, the transfer body 6 is disposed rotatably about the axis of rotation 27 of the connecting element 25. The position of the connecting element 25 and the axis of rotation 27 is selected in such a manner that due to the belt tension the transfer body is pressed onto the stop 26. As a result of this kinematic arrangement, a stable fixed position of the transfer body 6 is achieved during operation of the apparatus according to the invention. In particular, this means that the resulting force vector 24 runs at a distance from the axis of rotation 27 of the connecting element where the direction of this distance is offset in the direction of the stop 26.

In a second position—that position in which the outline of the transfer body is indicated by a dashed line—the transfer body 6 is folded away from the stop 26 about the axis of rotation 27. By varying the position of the transfer body 6, the conveyor belt 3 also changes its position. In particular, the conveyor belt is relieved of strain by the folding away of the transfer body 6.

As in the preceding description, in the diagram in FIG. 3 the stop 26 is also height-adjustable. This is accomplished, in particular, by means of the height adjustment 28, which for example, enables an adaptation of the position and/or rotary position of the transfer body 6 about the axis of rotation 27 of the connecting element 25 by variation of the length of a shaft.

Furthermore, in the present diagram of FIG. 3 the apparatus and the transfer body 6 have a transfer surface 16. This is disposed in the area of the transfer body and runs substantially along the transport direction 19.

Figure 4:
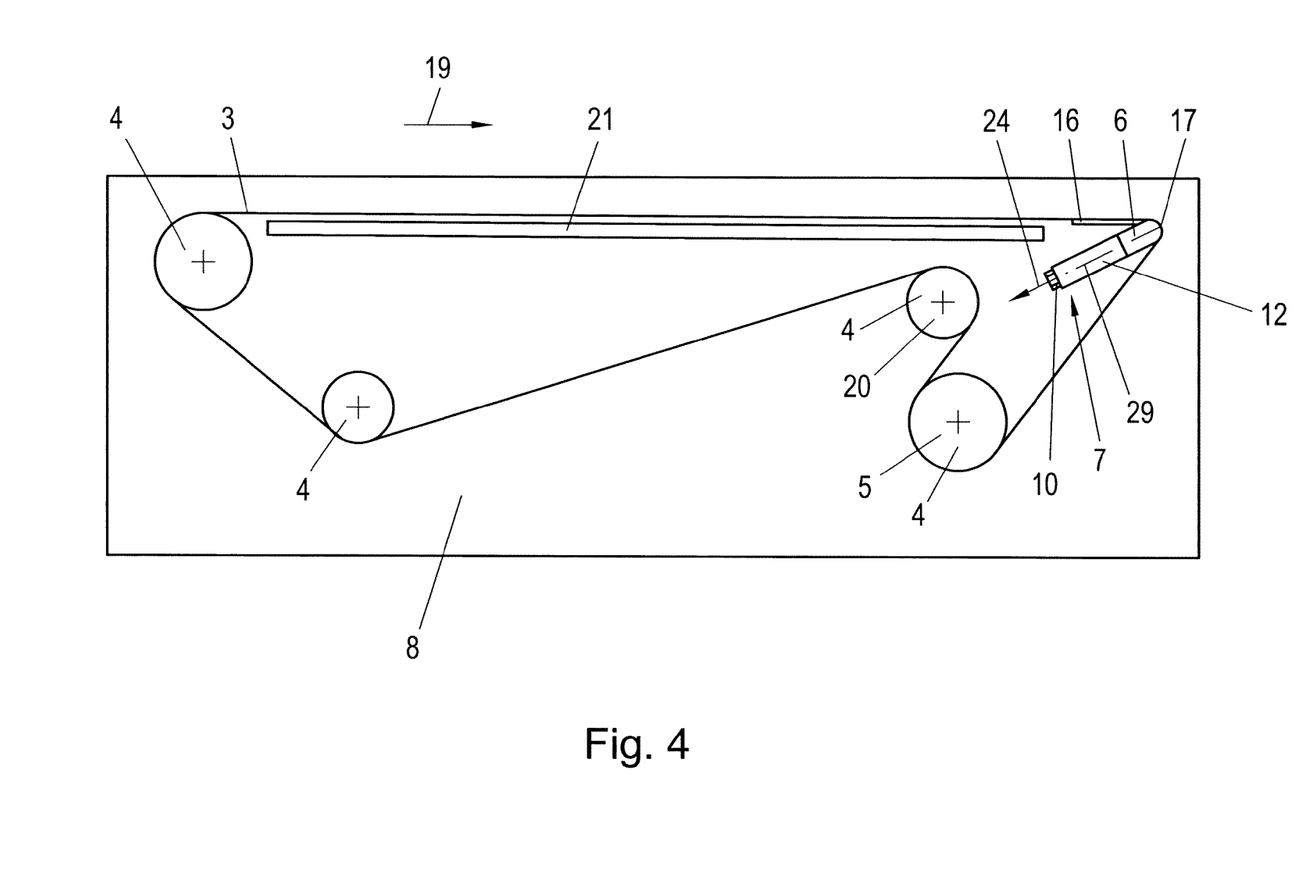
FIG. 4 shows a further embodiment of an apparatus according to the invention in a schematic side view.

FIG. 4 shows another embodiment of the apparatus according to the invention. Similarly to FIG. 1, a revolvingly driven conveyor belt 3 is guided around a plurality of deflecting rollers 4 also comprising a drive roller 5 and a tensioning roller 20 and around a transfer body 6. As in FIG. 1 the drive roller 5 is rotationally driven by means of a drive. This subsequently brings about a drive of the conveyor belt 3. The direction of movement of the conveyor belt follows the transport direction 19 at least in the upper region shown. The transport direction 19 corresponds to the transport direction of the shaped body 1 which in this view like the transport surface 2 is also not shown. The transfer body 6 has an adjusting apparatus 7. The adjusting apparatus 7 in turn comprises one or more tensile elements 12 and a pressure element 10. In the present embodiment a symmetry plane of the transfer body runs substantially along the resulting force vector 24. Due to the geometrical configuration the force vector 24 therefore runs through the centre of gravity of the cross-sectional area of the transfer body. The force transmitted by the belt tension to the transfer body 6 therefore produces a substantially two-dimensional bending of the transfer body 6 without curving. The bending line 9 thus substantially follows the plane of symmetry of the transfer body.

Furthermore a transfer surface 16 is provided in the transfer body. This preferably opens into the transfer contour 17 of the transfer body 6. The arrangements of the rollers and the transfer body 6 are mounted on the machine frame 8. The machine frame 8 preferably comprises two side plates which substantially follow the transport direction 19 and are arranged vertically.

Figure 5:
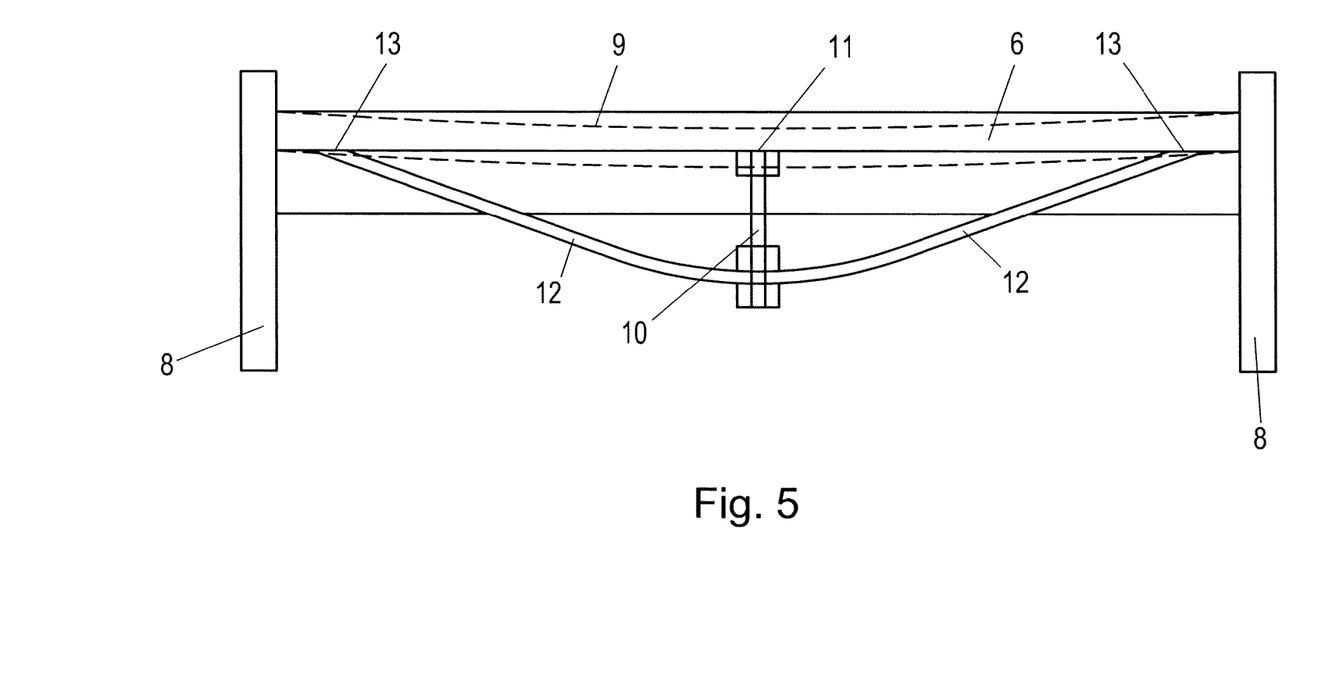
FIG. 5 shows a schematic view of crucial parts of the invention, where the viewing axis is substantially normal to the axis of symmetry of the transfer body.

FIG. 5 shows a view of crucial parts of FIG. 4, where the viewing direction is substantially normal to the resulting force vector 24 and/or the plane of symmetry 29 of the transfer body. The transfer body 6 is laterally mounted in the machine frame 8 and is influenced in its shape by an adjusting apparatus 7. In particular the bending line 9 is influenced and/or variable by the tension of the adjusting apparatus 7. To this end the adjusting apparatus in turn comprises tensile elements 12 which are provided at connection points 13 on the transfer body 6.

Furthermore the force of the tensile elements 12 on the transfer body 6 is supported at a support point 11. The production of the tension and/or the forces is accomplished by means of a pressure element 10. The operating mode of the pressure element 10 substantially corresponds to the function of the pressure element of FIG. 2 or the general part of the description.

In the embodiments shown the tension rods 12 are shown as band-shaped bodies. These can be executed for example by metal bands, metal strips, plastic strips etc. The tensile elements 12 can, however also be executed by steel cables, cables made of other materials, rods connected in an articulated manner, chain-shaped tensile elements etc.

The pressure element 10 can, for example, be designed as a screw shank with twistable nuts but other adjusting elements such as, for example, toggle levers, crank assemblies or similar apparatus for use in the present apparatus are also suitable.

According to another embodiment not shown, the pressure element 10 of FIG. 5 or FIG. 2 is replaced by a rigid element such as, for example, a rigid bolt. This is invariable in its length. For matching of the tensions and/or the bending line 9 of the transfer body 6, the length of the tension elements 12 can be varied.

REFERENCE LIST

1. Shaped body
2. Transport surface
3. Conveyor belt
4. Deflecting roller
5. Drive roller
6. Transfer body
7. Adjusting apparatus
8. Machine frame
9. Bending line
10. Pressure element
11. Support point
12. Tensile element
13. Connection point
14. Central region
15. Outer region
16. Transfer surface
17. Transfer contour
18. Transfer gap
19. Transport direction
20. Tensioning roller
21. Guide means
22. Force vector incoming belt
23. Force vector outgoing belt
24. Resulting force vector
25. Connecting element
26. Stop
27. Axis of rotation of connecting element
28. Height adjustment
29. Plane of symmetry

The invention claimed is:

1. An apparatus for transporting and for transferring shaped bodies onto a transport surface, the apparatus comprising:
   a revolving driven conveyor belt disposed to transfer the shaped bodies to the transport surface;
   a transfer body mounted laterally on a machine frame and disposed in a vicinity of the transport surface;
   said conveyor belt being guided around at least one deflecting roller, a driven roller and, in a region of the transport surface, around said transfer body; and
   an adjusting device configured for varying and adapting a bending line of said transfer body, said adjusting device having a pressure element supported on a support point of said transfer body; and
   two tensile elements each coupled to said transfer body at a respective connection point positioned remotely from said support point on said transfer body.

2. The apparatus according to claim 1, wherein the shaped bodies are substantially non-rigid shaped bodies of biscuit or cookie dough.

3. The apparatus according to claim 1, wherein said pressure element is a threaded screw.

4. The apparatus according to claim 1, wherein said support point is disposed in a central region of said transfer body and said connection points are disposed laterally on both sides of said central region respectively in an outer region of said transfer body.

5. The apparatus according to claim 1, wherein said transfer body has a transfer surface and said the support point of said adjusting device is provided on an opposite side of said transfer body.

6. The apparatus according to claim 1, wherein said transfer body is formed with a transfer edge.

7. The apparatus according to claim 6, wherein said transfer edge is a transfer blade or a transfer plate.

8. The apparatus according to claim 1, wherein said support point is disposed in a region of a greatest amount of sagging of said transfer body.

9. The apparatus according to claim 1, wherein said connection points of said tension elements are each provided in a region of said machine frame on said transfer body.

* * * * *